July 4, 1961

E. W. KRAFT 2,991,418

GAUGE CALIBRATION ARRANGEMENT

Filed June 26, 1959

INVENTOR
EDMOND W. KRAFT.

BY John C. Black
ATTORNEY.

July 4, 1961  E. W. KRAFT  2,991,418
GAUGE CALIBRATION ARRANGEMENT
Filed June 26, 1959  2 Sheets-Sheet 2

INVENTOR
EDMOND W. KRAFT.

BY John C. Black
ATTORNEY.

United States Patent Office 2,991,418
Patented July 4, 1961

2,991,418
GAUGE CALIBRATION ARRANGEMENT
Edmond William Kraft, Roselle, Ill., assignor to Stewart-Warner Corporation, Chicago, Ill., a corporation of Virginia
Filed June 26, 1959, Ser. No. 823,208
4 Claims. (Cl. 324—106)

This invention relates to a gauge calibration arrangement and more specifically relates to an arrangement wherein the respective upper and lower limits of a gauge indicator are calibrated with only one adjustment or setting of each.

The gauge with which the present invention is illustrated is of the type commonly used, for example, as a fuel or temperature indicator in the motor transportation industry. Gauges of this type generally comprise a bimetal strip having a heater winding thereon for controlling or actuating an indicator or pointer, and are commonly called thermal gauges. The position of a free end of the bimetal is made to vary in accordance with a condition of the unit or object to be measured, such as engine temperature or fuel supply. In such an arrangement, the electrical energy passing through the resistance winding produces heat as a function of the energy to control the movement of the bimetal strip in a well-known manner. The bimetal strip in reacting to the electrical energy in the heater winding is adapted to move, pivot or rotate the pointer in accordance with the electrical energy, which passes through the winding. The pointer thereby registers or indicates the value of the condition which the gauge represents.

Previous arrangements of such gauges have embodied either a fixed pivot or a suspended pivot for the pointer. However, in either arrangement, the practice has been, after asesmbling the gauge, to first pass through the winding a predetermined amount of current corresponding to one of the limits, which the gauge should indicate. The bimetal strip in reacting thereto pivots the pointer accordingly. A manual adjustment is then made of the components to bring the pointer into alignment with a dial scale extremity on an indicating face, at which, this limit is normally indicated. In one instance, this adjustment in the assembled gauge is made by positioning the pointer longitudinally.

Another current value corresponding to the other limit, which the pointer is required to indicate, is then passed through the winding. The winding now controls the bimetal strip to move the pointer toward the other dial scale extremity. The components are again adjusted to bring the pointer into alignment with the other dial scale extremity, at which the other limit is normally indicated.

In known devices of this type, adjusting the pointer position to the other limit, after the first has been adjusted, results in the first needle setting being thrown off. The first procedure for adjusting the needle setting must then be repeated. As a rule, this results in throwing the second adjustment off, necessitating that it be repeated. In this fashion, both adjustments are repeated a number of times, until a satisfactory compromise is achieved. As may be appreciated, this is an expensive and time consuming calibrating arrangement.

The present invention is designed to reduce the number of adjustments to achieve the required calibration. It permits the adjustment for both the upper and lower limits of the pointer needle to be achieved in one setting of each.

Briefly to accomplish this, the needle structure is provided with a slot, which engages a pin carried by the bimetal strip. The bimetal strip is provided with one rotational mounting and the needle structure in addition to its normal rotational mounting is adapted to be rotated in another arc substantially parallel to the slot, when the needle is at one calibrating position. Thus with a predetermined value of current in the winding controlling the bimetal, the needle is moved to a corresponding position. The bimetal is then rotated and the pin bearing against a side of the slot rotates the needle about its normal mounting to the desired calibrated position. With this setting of the bimetal and needle, the needle thereafter moves to the desired position, whenever the winding is energized by said predetermined current. If the winding is now energized to another predetermined value of current, the bimetal reacts to rotate the needle toward a position corresponding to that value. By now rotating the needle structure through said other arc, it is brought into alignment with the desired calibrated setting for the other value of current. Thus the needle is adjusted for the second adjusted position without disturbance of the first adjusted position. The needle is therefore moved to the respective desired positions, whenever controlled accordingly by the bimetal strip.

Accordingly, an object of the present invention is to provide a gauge calibration arrangement, which permits the gauge indicator to be set for two different positions with independent adjustments for each position.

A feature of this invention is the provision of a gauge assembly in which calibration is achieved by two separate adjustments one of which does not appreciably affect the other.

Another feature of this invention is the arrangement for rotating a gauge indicator about parallel axes without disturbing the setting of said indicator with respect on one axis, when rotated about the other.

Other objects and features of this invention will become apparent on reading of the following specification and claims in conjunction with the drawings.

Referring now to the drawings.

Figures 1, 2:
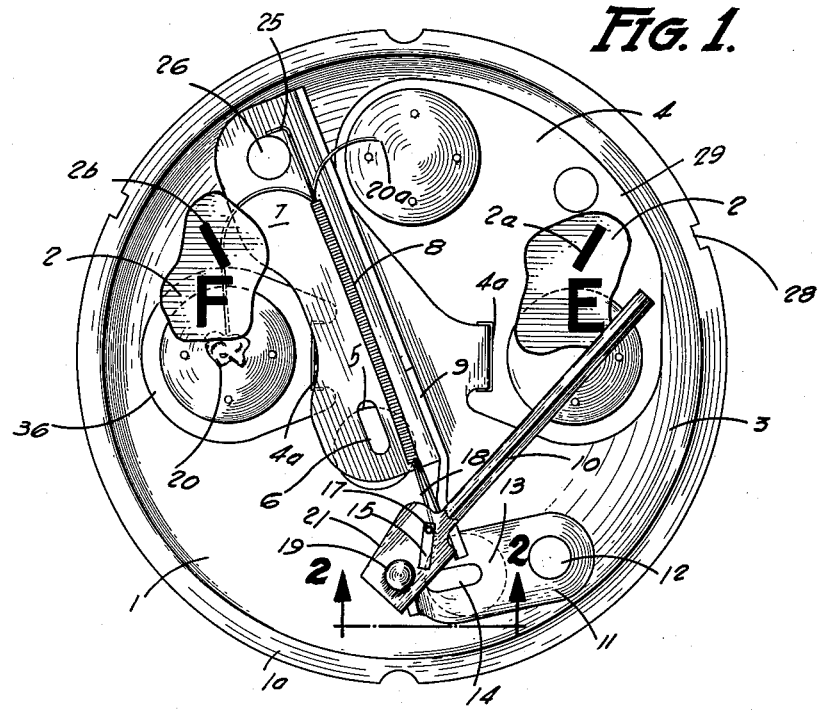
FIG. 1 shows one arrangement of the invention mounted in a common type of gauge case with the indicator face plate removed.
FIG. 2 is a sectional view taken along the line 2—2 in FIG. 1.
Figure 4:
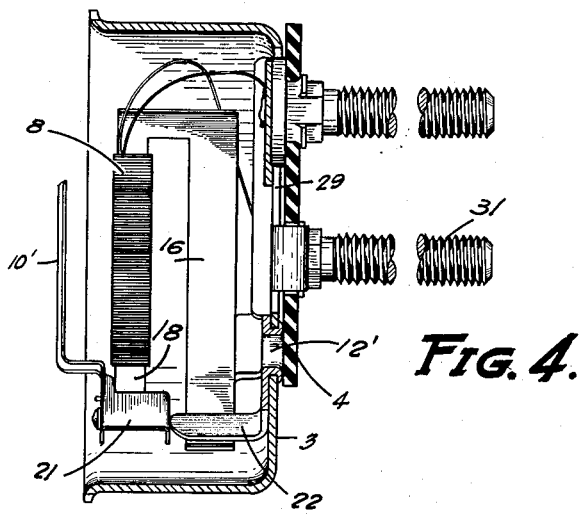
FIG. 4 is a sectional view taken along the line 4—4 in FIG. 3.

Referring now to FIG. 1, it will be seen that the gauge comprises a cup shaped housing 1 having a cylindrical wall portion 1a and a back mounting plate 3. As a rule, the wall portion 1a and plate 3 are formed integrally. The cylindrical wall portion 1a has a lip or flange formed thereon, which is notched at 28 for a purpose to be described. In addition, apertures 5, 12, 13, 26, and 29 are provided in the back plate 3. Apertures 12 and 26 are each adapted to receive a respective ring shaped boss on one end of brackets 11 and 7 respectively. Each ring is staked over plate 3, as shown in connection with aperture 12′ in FIG. 4. This type of arrangement provides a rotational movement with considerable frictional retarding action and of very economical construction. Thus whenever either bracket 7 or 11 is rotated to a particular position, the tight fractional contact between the boss and the back plate 3 holds the bracket in position.

The pointer 10 is rotatably mounted on a shaft or pin 19 by means of suitable apertures in the bifurcated bracket 21 formed integral therewith. The disposition of the pointer 10 relative to a calibrated scale on a face dial, partially shown at 2a and 2b, indicates to an observer the condition of the object being measured. As shown in FIG. 1, the pointer is displayed for movement in a counter clockwise direction of approximately 60°. It indicates, for example, the empty condition of a fuel tank when it is aligned with the scale line shown at 2a. In practice, the gauge housing with this type of movement is rotated 180° about an axis through its center and perpendicular to the plane of the paper, when mounted on a truck or auto dashboard. At the other extreme position, the pointer should be in alignment with a scale line shown at 2b, which corresponds to a full tank condition. The bracket portion 21 of pointer 10 is provided with a slot 15 for receiving a pin 17.

Pin 17 is fixedly attached to one end of the upper leg 18 of a bifurcated or U-shaped bimetal strip 25. The shape of the bimetal strip is perhaps most clearly seen in FIG. 4. The upper leg 18 of the bimetal strip has wound thereon a heater winding 8, the respective ends of which, are extended to terminals 20 and 20a respectively. From terminals 20 and 20a suitable electrical connections are extended by means of mounting studs 31. The connections are extended in any well-known manner for completing a circuit from a variable resistance or other device, which controls the circuit current in accordance with the condition of the object to be measured.

One or both of the mounting studs 31 are suitably insulated from ground, when mounted. Each is insulated from the housing 1 by the insulator 4, shown in FIGS. 2 and 4, and covering apertures 29 and 36 in the back plate 3. The insulator 4 is attached to the back of plate 3 by means of the tongues 4a, which protrude through appropriate apertures in insulator 4 to hold it, as shown in FIG. 2.

Brackets 7 and 11 are each provided with a respective slot 6 and 14. Each slot is in alignment with respect to apertures 5 and 13 respectively in the back plate 3. This permits rotation of the respective brackets 7 and 11 by the insertion of an appropriate tool through apertures 5 and 13 respectively. The tool is brought to bear against either side of slots 6 and 14 respectively, to rotate the corresponding brackets 7 and 11 about their respective pivots at apertures 26 and 12 respectively.

Bracket 7 is formed with a leg or flange 9. The leg 9 is at substantially a right angle to the plane of the back plate 3, when the bracket is assembled. Leg 9 has formed thereon at one end a raised portion 9a, as seen in FIG. 2. Portion 9a is disposed substantially underneath needle 10 and has fixedly attached thereto one end of the lower leg 16 of bimetal strip 25. As before stated, upper leg 18 of the bimetal strip has attached thereto or carries pin 17 in engagement with needle slot 15. The opposite end of the bimetal is therefore free to permit the strip 25 to adjust for ambient temperature changes, as is well known. In this arrangement, when the strip is heated by current through coil 8, it twists or bends to cause pin 17 to rotate the needle pointer about shaft 19.

The shaft 19 has rotationally mounted thereon the bracket 21 and needle 10. The bracket 21 is comprised of suitably apertured legs. It is held in position on shaft 19, between the head on the shaft and the right angle leg 22 on bracket 11 to which shaft 19 is fixedly attached. It is also further supported at its lower end, by a protrusion 23 on leg 22 as seen in FIG. 2.

The notch 28 in the cylindrical wall 1a of the housing 1 indicates the position with respect to which the pointer is usually aligned, when the winding 8 is deenergized. This alignment or prealignment is made when the components are assembled.

To adjust the gauge, a suitable source of current is applied to terminals 20 and 20a for energizing the winding 8. The current for energizing winding 8 is adjusted to correspond to that required for a predetermined setting of the pointer 10 with respect to the face plate (not shown). Thus, for example, if the device is calibrated for a fuel tank, the suitable limits being empty and full shown at scale lines 2a and 2b respectively, the needle must be disposed in alignment with line 2a to indicate empty. Likewise, the needle must be disposed in alignment with line 2b to indicate full.

The pointer position corresponding to empty is a few degrees counter clockwise from the notch 28. In at least 50% of the commercial gauges corresponding to FIGS. 1 and 3 of the drawings, the precalibration of the pointer in alignment with the notch 28, for example, obviates the requirements for the first adjustment.

Thus, in production, with the unit being assembled, substantially as shown, winding 8 is energized for indicating, for example, an empty tank condition. As the bimetal strip reacts to the energizing current, it bends to transfer its movement through pin 17 and the sides of slot 15 to the pointer 10. This rotates pointer 10 counter clockwise about shaft 19 toward line 2a somewhat with respect to notch 28. In the event that the pointer and line are not aligned, the operator inserts the aforementioned tool through aperture 5 and slot 6 to rotate bracket 7 either clockwise or counter clockwise, until needle 10 is brought in alignment with the empty position shown at line 2a. Due to the tight frictional mate between the ring boss on bracket 7 and the back plate 3, this position is held.

The operator now energizes the winding 8 in accordance with the opposite limit to which needle 10 should move. In this example, if pointer 10 does not move to a position in alignment with the full position indicated by line 2b, the operator this time inserts the aforementioned tool through aperture 13 and slot 14. Bracket 11 is then rotated accordingly about its pivotal mounting at aperture 12 to bring needle 10 in alignment with line 2b.

Referring to FIG. 2, it will be seen that the vertically disposed portion 22 on bracket 11 fixedly carries shaft 19. Thus, as bracket 11 rotates in response to the operation of the tool in slot 14, it swings shaft 19 in an arc around the rotational mounting in aperture 12. Because slot 15 is cut substantially parallel to the arc over which shaft 19 travels (when the pointer is aligned with line 2a), pin 17 is left comparatively undisturbed. Thus the bimetal strip and bracket 7 remain in their formerly adjusted position, while pointer 10 follows the rotation of shaft 19 with practically no rotation thereabout, dependent on how closely slot 15 is cut to parallel the arc followed by shaft 19. Therefore, further adjustment of the needle pointer is rendered unnecessary unless unusual circumstances arise such as improper tolerances in the assembled components.

It will be noted, however, that a shift does arise in the distance between the pin 17 and the shaft 19, as the latter is displaced either towards or away from the pin. It is this change in the relative positions between the pin and shaft which adjusts the leverage between the bimetal strip 25 and the pointer 10 for proper pointer deflection as a function of the instantaneous current energizing the winding 8. That is, as the distance between the pin 17 and shaft 19 is shortened, the pointer will move through a greater arc incident to any given bimetal deflection.

Figure 3:
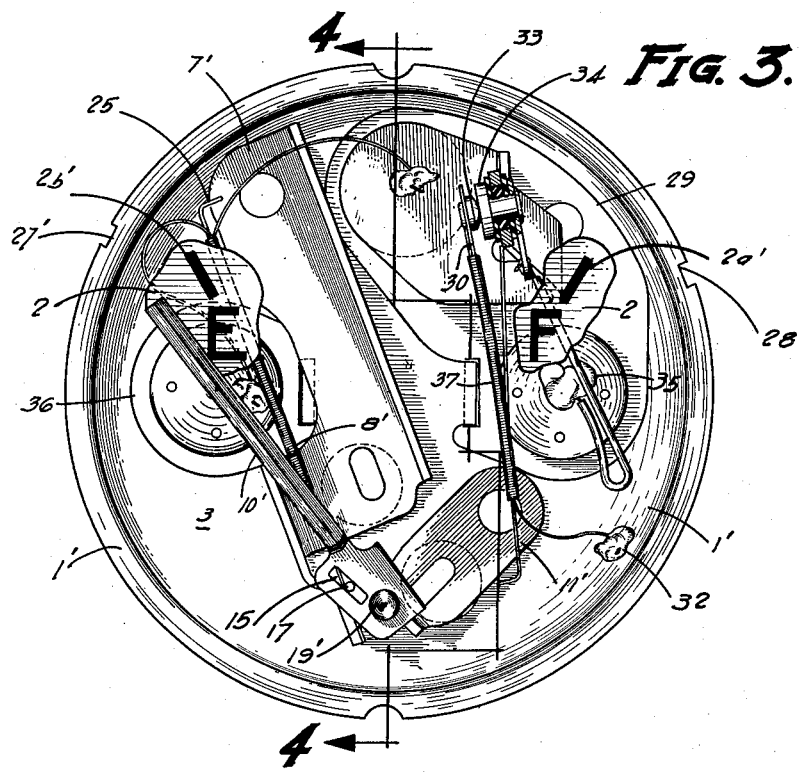
FIG. 3 shows another arrangement of the invention in which the location of one of the pivotal mountings is changed to illustrate clockwise movement for the indicator.

Referring now to FIG. 3 showing a slightly different disposition of the components, it will be seen that the pivot point for bracket 11' has been altered. This is done primarily to provide a gauge, whose limits are disposed at opposite ends of the arc traveled by pointer 10' from that shown in FIG. 1. Here it will be noted that adjustment of bracket 7', after enerization of winding 8', all as explained, rotates the needle 10' from precalibration notch 27' about shaft 19' into alignment with the empty scale line 2b'. Thereafter, bracket 11' is adjusted, as explained, to set needle 10' in alignment with line 2a' corresponding to the opposite limit to which it is desired to move the pointer 10'. As in the case of the structure of FIGS. 1 and 2, the second adjustment has no appreciable effect upon the first adjustment.

In addition, as shown in FIG. 3, a voltage regulator comprising a bimetal strip 30 having a winding 37 thereon is mounted in housing 1'. Voltage regulators of this type are commonly used for well understood purposes in autos, trucks and buses. Its mounting in the same housing, as the gauge, provides a number of obvious advantages. One end of the winding 37 is extended to the grounded housing 1' at 32. The other end of the winding 37 is brought in contact with the bimetal strip in any well-known manner, and extended through contact members 33 and 34 to terminal 35. The terminal 35 may be connected to the nongrounded terminal of a source. As the bimetal strip 30 is deformed by heat produced by the electrical energy passing through the coil 37, contact members 33 and 34 separate to open the circuit. Thereafter, as the bimetal strip cools due to the open circuit condition, contact members 33 and 34 are brought into contact to again complete the circuit. The contact pressure between the contacts 33 and 34 when the bimetal is at room temperature, determines the relative open and closed time intervals of the contacts during operation. This in effect produces the equivalent of a constant voltage.

Thus being described two embodiments of the invention, I am appending hereto a series of claims, which are believed to encompass the invention.

What is claimed is:

1. The method of calibrating a thermal gauge of the type in which a shaft pivotally carries an indicator member and in which a bimetal member having a heating coil engages the pointer member to selectively move the pointer about the shaft axis in accordance with the value of the electrical energy passing through the coil comprising the steps of mounting the shaft for movement in an arc about a spaced parallel second axis, mounting the bimetal member for rotation about a spaced parallel third axis, selecting a precalibrating position and a first and second spaced calibrating positions of the indicator member corresponding to zero, first, and second energy values in the coil, providing a pin on one of the members and a cooperating slot in the other member for actuation of the indicator member by the bimetal member, positioning the shaft to set the indicator member in the zero energy position thereof, forming the slot for elongation which, in the first calibrating position, is in a direction generally normal to a line connecting the shaft axis and the second axis, energizing the coil to the first energy value to move the indicator member toward its first calibrating position, rotating the bimetal member about the third axis while the coil is energized by said first energy value to adjust the pointer in said first calibrating position, energizing the coil to the second energy value, and moving the shaft about the second axis to adjust the pointer in the second calibrating position without appreciably affecting the first calibration adjustment.

2. The method of calibrating a thermal gauge of the type in which a shaft pivotally carries an indicator and in which a bimetal having a heating coil engages the pointer member to selectively move the pointer about the shaft axis in accordance with the value of the electrical energy passing through the coil comprising the steps of mounting the shaft for movement in an arc about a spaced parallel second axis, mounting the bimetal for rotation about a spaced parallel third axis, selecting a precalibrating position and a first and second spaced calibrating positions of the indicator corresponding to zero, first, and second energy values in the coil, providing a pin on the bimetal and a cooperating slot in the indicator for actuation of the indicator by the bimetal, positioning the shaft to set the indicator in the zero energy position thereof, forming the slot for elongation which, in the first calibrating position, is in a direction generally normal to a line connecting the shaft axis and the second axis, energizing the coil to the first energy value to move the indicator toward its first calibrating position, rotating the bimetal about the third axis while the coil is energized by said first energy value to adjust the pointer in said first calibrating position, energizing the coil to the second energy value, and moving the shaft about the second axis to adjust the pointer in the second calibrating position without appreciably affecting the first calibration adjustment.

3. In a thermal gauge of the type in which a shaft carried by a mounting structure pivotally supports an indicator, in which a generally U-shaped bimetal carried by the mounting structure is actuated by a heater coil to positions corresponding to the value of current flowing in the coil and in which a pin secured to the free end of one of the legs of the bimetal cooperates with a slot in the indicator to move the indicator to a position corresponding to the current value, the combination with the shaft, indicator and bimetal of an improved calibrating means comprising a first bracket pivotally supporting the shaft on the mounting structure for movement in an arc about a first axis spaced from and parallel to the shaft axis and manually adjusted to position the indicator in a selected precalibrating position with zero current in the coil, a second bracket pivotally supporting the free end of the other leg of the bimetal on the mounting structure and manually adjusted with a first calibrating current value in the coil to position the indicator in a selected first calibrating position corresponding to the first current value, the slot formed in the indicator for elongation which, in the first calibrating position of the pointer, is in a direction substantially normal to a line connecting the shaft axis and the first axis to prevent substantial movement of the indicator from said first calibrating position incident to movement within limits of the first bracket, the first bracket manually adjusted with a second calibrating current value in the coil to position the indicator in a second calibrating position corresponding to the second current value, whereby movement of the first bracket to adjust the indicator to the position corresponding to the second current value does not appreciably affect the calibration made by the second bracket.

4. In a thermal gauge of the type in which a shaft carried by a mounting structure pivotally supports an indicator, in which a generally U-shaped bimetal carried by the mounting structure is actuated by a heater coil to positions corresponding to the value of current flowing in the coil and in which a pin secured to the free end of one of the legs of the bimetal cooperates with a slot in the indicator to move the indicator to a position corresponding to the current value, the combination with the shaft, indicator and bimetal of an improved calibrating means comprising a first bracket pivotally supporting the shaft on the mounting structure for movement in an arc about a first axis spaced from and parallel to the shaft axis, a second bracket pivotally supporting the free end of the other leg of the bimetal on the mounting structure and manually adjusted with a first calibrating current value in the coil to position the indicator in a selected first calibrating position corresponding to the first current value, the slot formed in the indicator for elongation which, in the first calbirating position of the pointer, is in a direction substantially normal to a line connecting the shaft axis and the first axis to prevent substantial movement of the indicator from said first calibrating position incident to movement within limits of the first bracket, the first bracket manually adjusted with a second calibrating current value in the coil to position the indicator in a second calibrating position corresponding to the second current value, whereby movement of the first bracket to adjust the indicator to the position corresponding to the second current value does not appreciably affect the calibration made by the second bracket.

References Cited in the file of this patent

UNITED STATES PATENTS

| | | |
|---|---|---|
| 2,107,560 | Boddy | Feb. 8, 1938 |
| 2,303,216 | Malone | Nov. 24, 1942 |